US009604293B2

United States Patent
Shibayama et al.

(10) Patent No.: US 9,604,293 B2
(45) Date of Patent: Mar. 28, 2017

(54) CORRUGATED TUBE CUTTING DEVICE AND MANUFACTURING METHOD OF CUT CORRUGATED TUBE

(75) Inventors: Kouichi Shibayama, Tochigi (JP); Masayoshi Shinohara, Tochigi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 433 days.

(21) Appl. No.: 14/126,557

(22) PCT Filed: Feb. 7, 2012

(86) PCT No.: PCT/JP2012/052669
§ 371 (c)(1),
(2), (4) Date: Dec. 16, 2013

(87) PCT Pub. No.: WO2013/008483
PCT Pub. Date: Jan. 17, 2013

(65) Prior Publication Data
US 2014/0116214 A1 May 1, 2014

(30) Foreign Application Priority Data
Jul. 8, 2011 (JP) ................ 2011-151713

(51) Int. Cl.
*B26D 5/00* (2006.01)
*B23D 21/00* (2006.01)
(Continued)

(52) U.S. Cl.
CPC .............. *B23D 21/00* (2013.01); *B26D 3/16* (2013.01); *B26D 5/007* (2013.01); *B26D 5/34* (2013.01);
(Continued)

(58) Field of Classification Search
CPC . B26D 3/16; B26D 5/007; B26D 5/34; B23D 21/00; Y10T 83/0596; Y10T 83/543
(Continued)

(56) References Cited

U.S. PATENT DOCUMENTS 3,730,035 A * 5/1973 Bhatia ............... B26D 3/16
83/169
3,748,934 A * 7/1973 Lezberg ............ B23B 25/06
82/48
(Continued)

FOREIGN PATENT DOCUMENTS

| JP | 6-344215 | 12/1994 |
|----|----------|---------|
| JP | 9-117818 | 5/1997 |

(Continued)

OTHER PUBLICATIONS

International Search Report, mail date is May 1, 2012.

*Primary Examiner* — Omar Flores Sanchez
(74) *Attorney, Agent, or Firm* — Greenblum & Bernstein, P.L.C.

(57) ABSTRACT

A purpose of the present invention is to provide a technology that allows corrugated tubes of various diameter sizes to be easily and reliably cut at a convex portion. In order to achieve the purpose, a cutting device is provided with a feeder feeding a corrugated tube such that an axial direction of the corrugated tube lies along a feeding path; a cutter cutting along a circumferential direction of the corrugated tube being fed along the feeding path; and an imager capturing an image of a planned cutting position of the corrugated tube. A controller performs image analysis of the captured image of the planned cutting position to determine whether the planned cutting position is a convex portion of the corrugated tube and, when a positive determination
(Continued)

result is obtained, causes the cutter to cut the corrugated tube at the planned cutting position.

8 Claims, 9 Drawing Sheets

(51) Int. Cl.
  *B26D 3/16* (2006.01)
  *B26D 5/34* (2006.01)
  *B26D 7/06* (2006.01)
  *B26D 3/00* (2006.01)
  *B29D 23/18* (2006.01)

(52) U.S. Cl.
  CPC ............ *B26D 3/003* (2013.01); *B26D 7/0625* (2013.01); *B29D 23/18* (2013.01); *Y10T 83/0596* (2015.04); *Y10T 83/543* (2015.04)

(58) Field of Classification Search
  USPC .......................................... 83/360, 371, 367
  See application file for complete search history.

(56) References Cited

U.S. PATENT DOCUMENTS

| | | | | |
|---|---|---|---|---|
| 3,843,758 A | * | 10/1974 | Maroschak | B26D 3/16 264/151 |
| 3,877,831 A | * | 4/1975 | Maroschak | B23B 39/20 408/32 |
| 6,112,132 A | * | 8/2000 | Grube | B24B 1/002 700/117 |
| 2006/0156878 A1 | * | 7/2006 | Faires | A22C 7/00 83/13 |
| 2011/0023676 A1 | * | 2/2011 | Booms | B26D 1/1575 83/322 |
| 2012/0198974 A1 | * | 8/2012 | Weber | B26D 5/007 83/13 |
| 2013/0074667 A1 | * | 3/2013 | Weber | B25J 9/0051 83/73 |

FOREIGN PATENT DOCUMENTS

| | | |
|---|---|---|
| JP | 2000-141291 | 5/2000 |
| JP | 2001-334488 | 12/2001 |
| JP | 2006-296015 | 10/2006 |
| JP | 2009-60745 | 3/2009 |
| JP | 2010-23125 | 2/2010 |

* cited by examiner

| Size number | Convex portion width (mm) | Concave portion width (mm) | External diameter (mm) |
|---|---|---|---|
| 1 | 1.5 | 1.2 | 10 |
| 2 | 1.9 | 1.6 | 20 |
| 3 | 2.5 | 1.8 | 30 |

CORRUGATED TUBE CUTTING DEVICE AND MANUFACTURING METHOD OF CUT CORRUGATED TUBE

FIELD OF THE INVENTION

The present invention relates to a technology for cutting a corrugated tube.

BACKGROUND OF THE INVENTION

A corrugated tube is a tubular member having flexibility in an axial direction by being formed to have concave and convex portions alternating continuously along the axial direction, and is widely used as a protector or the like covering a circumference of an electric wire.

A corrugated tube is usually extended and fed from a bundled state and is cut to a required length for use. For example, Patent Literature 1 discloses a technology for length-adjusting and cutting a corrugated tube.

However a corrugated tube is preferably cut at a convex portion. This is because when a corrugated tube is cut at a convex portion, an opening area of the corrugated tube is large, so an electric wire or the like inserted into the corrugated tube can avoid being damaged by coming into contact with an open end of the corrugated tube.

Therefore, various technologies have been proposed for cutting a corrugated tube at a convex portion. For example, Patent Literature 2 proposes a technology to cut a corrugated tube at a convex portion by providing a detector that detects concavity and convexity of the corrugated tube and by driving a cutting blade in response to timing of when the detector detects the convex portion of the corrugated tube. Further, Patent Literatures 3 and 4 propose a technology in which a pair of holding pieces that are formed on a jig are respectively inserted into neighboring concave portions with a convex portion of a corrugated tube therebetween to fixate the corrugated tube, and then the convex portion sandwiched by the jig is cut.

RELATED ART

Patent Literature

[Patent Literature 1] Japanese Patent Laid-Open Publication No. 2000-141291
[Patent Literature 2] Japanese Patent Laid-Open Publication No. 2010-23125
[Patent Literature 3] Japanese Patent Laid-Open Publication No. 2006-296015
[Patent Literature 4] Japanese Patent Laid-Open Publication No. H9-117818

SUMMARY OF THE INVENTION

Problems to be Solved by the Invention

However, various types of corrugated tubes having different part sizes (diameter size, convex portion width, concave portion width, and the like) are manufactured and are respectively used according to a diameter, type, and the like of an electric wire that is inserted in the corrugated tubes. In this regard, there is a problem that the conventional technology for cutting a corrugated tube at a convex portion cannot flexibly respond to a change in the size of the corrugated tube. For example, in the technology of Patent Literature 2, each time the size of a corrugated tube is changed, a position or the like of the detector must also be changed. Further, in the technology of Patent Literatures 3 and 4, when the size of a corrugated tube is changed, the jig must also be replaced by one in which a distance between the holding pieces corresponds to the width of the new convex portion.

The present invention is accomplished in view of the above problems. A purpose of the present invention is to provide a technology that allows corrugated tubes of various sizes to be easily and reliably cut at a convex portion.

Means for Solving the Problems

As a first aspect, a corrugated tube cutting device includes a feeder that feeds a corrugated tube such that an axial direction of the corrugated tube lies along a feeding path; a cutter that cuts along a circumferential direction of the corrugated tube fed along the feeding path; an imager that captures an image of a planned cutting position of the corrugated tube; a determiner that performs image analysis of the captured image of the planned cutting position to determine whether the planned cutting position is a convex portion of the corrugated tube; and a cutting controller that causes the cutter to cut the corrugated tube at the planned cutting position when the determiner gives a positive determination result for the planned cutting position.

As a second aspect, in the corrugated tube cutting device according to the first aspect, the cutting controller causes the cutter to cut the corrugated tube at a position different from the planned cutting position when the determiner gives a negative determination result for the planned cutting position.

As a third aspect, the corrugated tube cutting device according to the first or the second aspect includes a regulator that is provided with a protrusion protruding to the feeding path, the regulator regulating an orientation along the circumferential direction of the corrugated tube that is fed along the feeding path by arranging the protrusion in a state of being inserted into an interior of the corrugated tube via a running slit along the axial direction of the corrugated tube.

As a fourth aspect, in the corrugated tube cutting device according to the third aspect, a plurality of the regulators are provided and are arranged at intervals along the feeding path.

As a fifth aspect, in the corrugated tube cutting device according to the fourth aspect, at least one of the plurality of the regulators is arranged between the planned cutting position and the feeder.

As a sixth aspect, in the corrugated tube cutting device according to any one of the first to fifth aspects, the determiner defines a partial area centered on the planned cutting position and having a width equal to a width of the convex portion of the corrugated tube as a determination target area on the captured image, and determines that the planned cutting position is the convex portion of the corrugated tube when a number of pixels originating from the corrugated tube in the determination target area is equal to or larger than a predetermined threshold, the predetermined threshold being defined according to a size of the corrugated tube, Further, as a seventh aspect, in the corrugated tube cutting device according any one of the first to sixth aspects, the cutter includes a cutting blade and a drive mechanism reciprocating the cutting blade along a cutting path crossing the feeding path, and the imager captures an image of an intersection of the feeding path and the cutting path.

As an eighth aspect, a manufacturing method of a cut corrugated tube includes: (a) a step of determining whether a planned cutting position is a convex portion of a corrugated tube by capturing an image of the planned cutting position of the corrugated tube and performing image analysis of the obtained captured image; and (b) a step of cutting the corrugated tube at the planned cutting position when a positive determination result for the planned cutting position is obtained at the step (a).

As eighth a ninth aspect, the manufacturing method of a cut corrugated tube according to the seventh eighth aspect includes: (c) a step of cutting the corrugated tube at a position that is distanced from the planned cutting position by a determined distance along an axial direction of the corrugated tube when a negative determination result for the planned cutting position is obtained in the step (a).

As a ninth tenth aspect, the manufacturing method of a cut corrugated tube according to the seventh eighth aspect includes: (d) a step of defining a position that is distanced from the planned cutting position by a determined distance along the axial direction of the corrugated tube as a new planned cutting position and performing the step (a) again when a negative determination result for the planned cutting position is obtained in the step (a); and (e) a step of repeating the step (d) until a positive determination result is obtained in the step (a).

Effect of the Invention

According to the first aspect, when the determiner gives a positive determination result for the planned cutting position, the cutting controller causes the cutter to cut the corrugated tube at the planned cutting position. Therefore, the corrugated tube can be reliably cut at the convex portion. In this case, the determiner performs image analysis of the captured image obtained by imaging the planned cutting position to determine whether the planned cutting position is the convex portion. Therefore, corrugated tubes of various sizes can be flexibly handled and an accurate determination result can be obtained. That is, in this aspect, corrugated tubes of various sizes can be easily and reliably cut at the convex portion.

According to the second aspect, when the determiner gives a negative determination result for the planned cutting position, the cutting controller causes the cutter to cut the corrugated tube at a position different from the planned cutting position. Therefore, it is possible to reliably avoid cutting the corrugated tube at the concave portion.

According to the third aspect, the regulator is provided that regulates the orientation along the circumferential direction of the corrugated tube that is fed along the feeding path. Therefore, twisting is unlikely to occur in the corrugated tube that is fed along the feeding path. Accordingly, it is possible to accurately determine whether the planned cutting position is the convex portion and to cut the corrugated tube in a straight manner along the circumferential direction of the corrugated tube.

According to the fourth aspect, the plurality of regulators are provided arranged at intervals along the feeding path. Therefore, twisting of the corrugated tube that is fed along the feeding path can be reliably prevented.

According to the fifth aspect, the regulator is provided arranged between the planned cutting position and the feeder. Therefore, the corrugated tube is ensured to be in a state free of twisting at the planned cutting position.

According to the sixth aspect, the determiner determines whether the planned cutting position is the convex portion of the corrugated tube based on whether the number of pixels originating from the corrugated tube in the determination target area is equal to or larger than the predetermined threshold. According to this configuration, by changing only the value of the threshold, it is possible to easily and accurately determine whether the planned cutting position is the convex portion of the corrugated tube with respect to corrugated tubes of various sizes.

According to the seventh eighth aspect, when a positive determination result that the planned cutting position is the convex portion is obtained, the corrugated tube is cut at the planned cutting position. Therefore, the corrugated tube can be reliably cut at the convex portion. In this case, a determination of whether the planned cutting position is the convex portion is made by capturing an image of the planned cutting position and performing image analysis of the captured image. Therefore, corrugated tubes of various sizes can be flexibly handled and an accurate determination result can be obtained. That is, in this aspect, corrugated tubes of various diameter sizes can be easily and reliably cut at the convex portion.

According to the eighth ninth aspect, when a negative determination result is obtained for the planned cutting position, the corrugated tube is cut at a position different from the planned cutting position for which the negative determination result is given. Therefore, it is possible to reliably avoid cutting the corrugated tube at the concave portion while inhibiting reduction in productivity.

According to the ninth tenth aspect, when a planned cutting position is found for which a positive determination result is given, the corrugated tube is cut at the planned cutting position. Therefore, it is possible to reliably avoid cutting the corrugated tube at the concave portion.

The purpose, features, aspects and advantages of the present invention will be made clearer by the following detailed description and the accompanying drawings.

MODE FOR CARRYING OUT THE INVENTION

In the following, an embodiment of the present invention is described with reference to the accompanying drawings.

The following embodiment is an example embodying the present invention and does not limit the technical scope of the present invention.

1. Corrugated Tube

Figure 1:
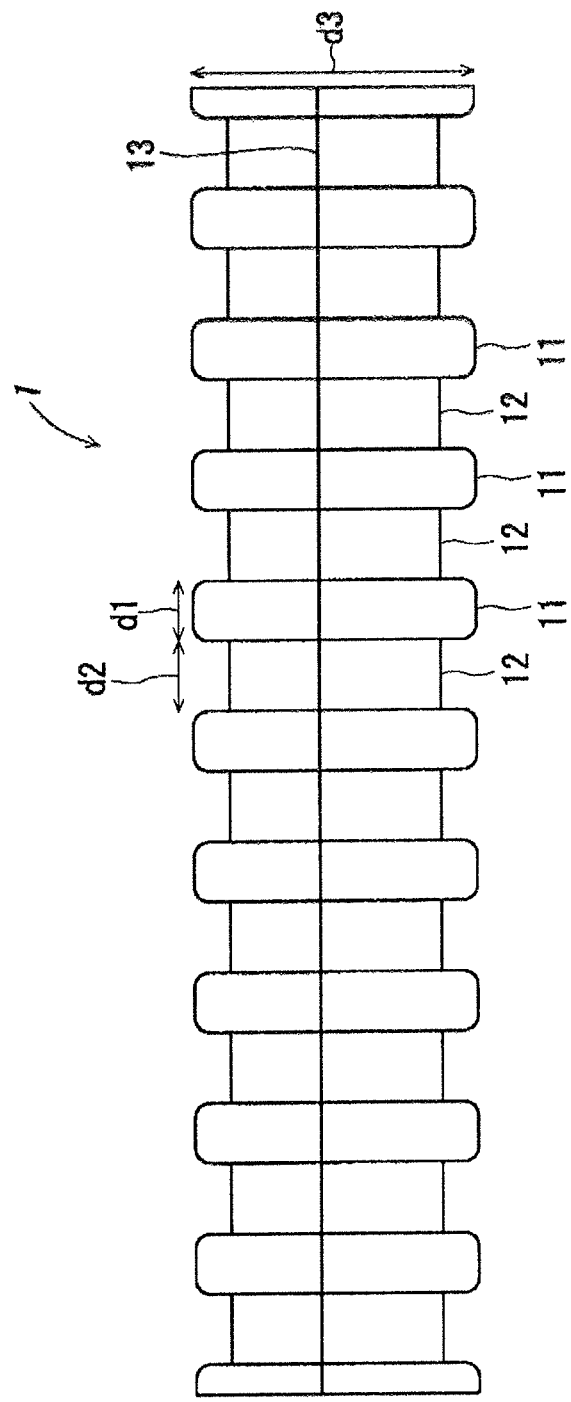
FIG. 1 is a plan view of a corrugated tube.

Before describing a cutting device 2, a corrugated tube 1 that is a target to be cut using the cutting device 2 is described with reference to FIG. 1. FIG. 1 is a plan view of the corrugated tube 1.

The corrugated tube 1 is a member formed with resin and the like and is formed in a long tubular shape. The corrugated tube 1 is provided with alternating annular convex portions 11 and annular concave portions 12 along an axial direction (longitudinal direction) and is formed in a bendable shape, the annular convex portions 11 being formed in a shape protruding along a circumferential direction of the corrugated tube 1 and the annular concave portions 12 being formed in a groove shape along the circumferential direction.

A running cut (slit) 13 is formed along the entire axial direction of the corrugated tube 1. The slit 13 is formed in parallel to an axis of the corrugated tube 1 (that is, so as to be straight, without twisting in the circumferential direction of the corrugated tube 1). The slit 13 functions as an insertion opening for inserting an electric wire or the like that is to be protected into the corrugated tube 1. That is, by using a jig or the like to put the slit 13 in a state of being spread toward both sides, the electric wire or the like that is to be protected can be inserted into an interior of the corrugated tube 1 through a gap formed in this state along the entire corrugated tube 1 in the axial direction.

2. Cutting Device 2

Figure 2:
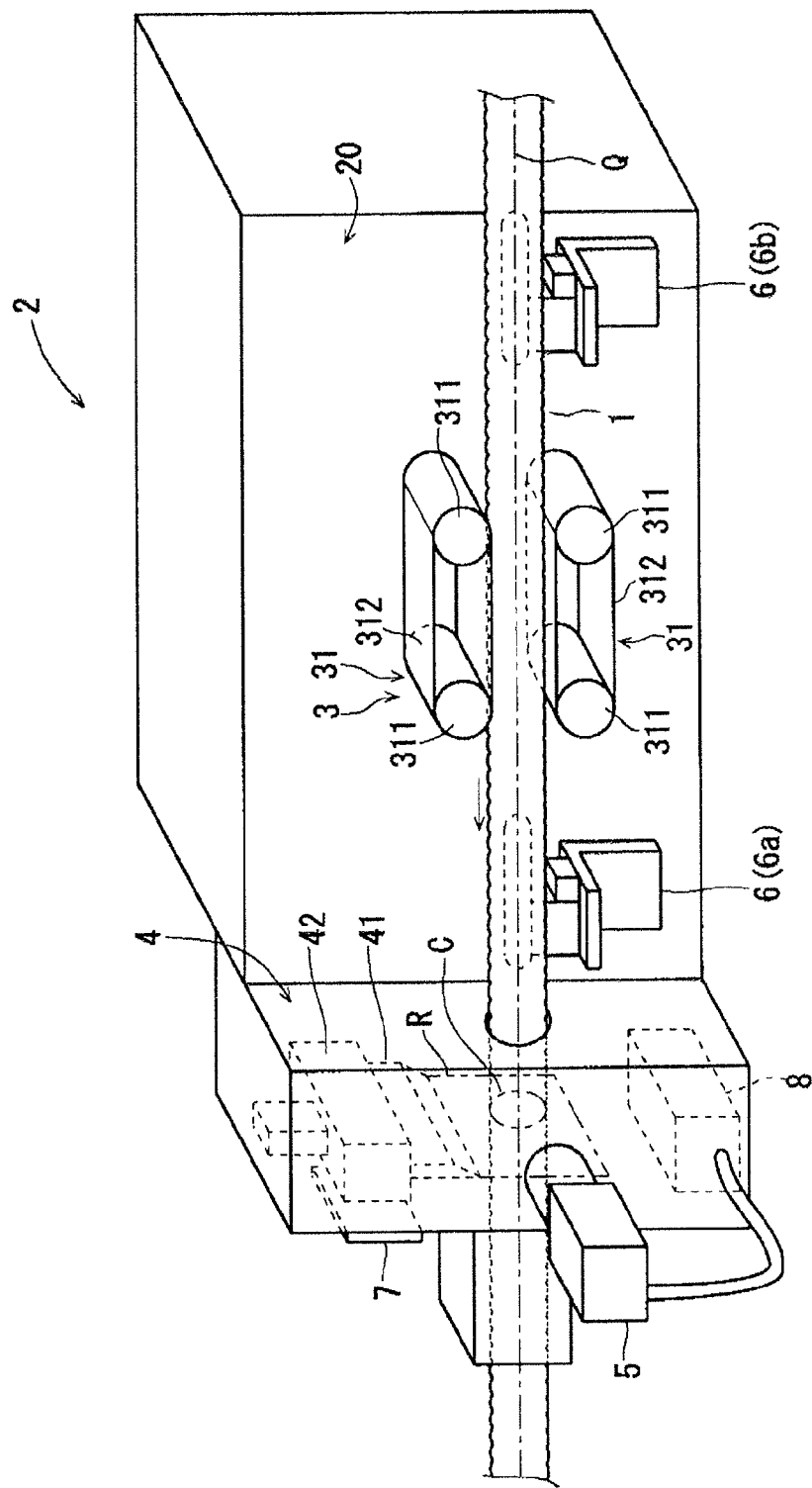
FIG. 2 is a schematic perspective view that schematically illustrates a configuration of a cutting device.
Figure 3:
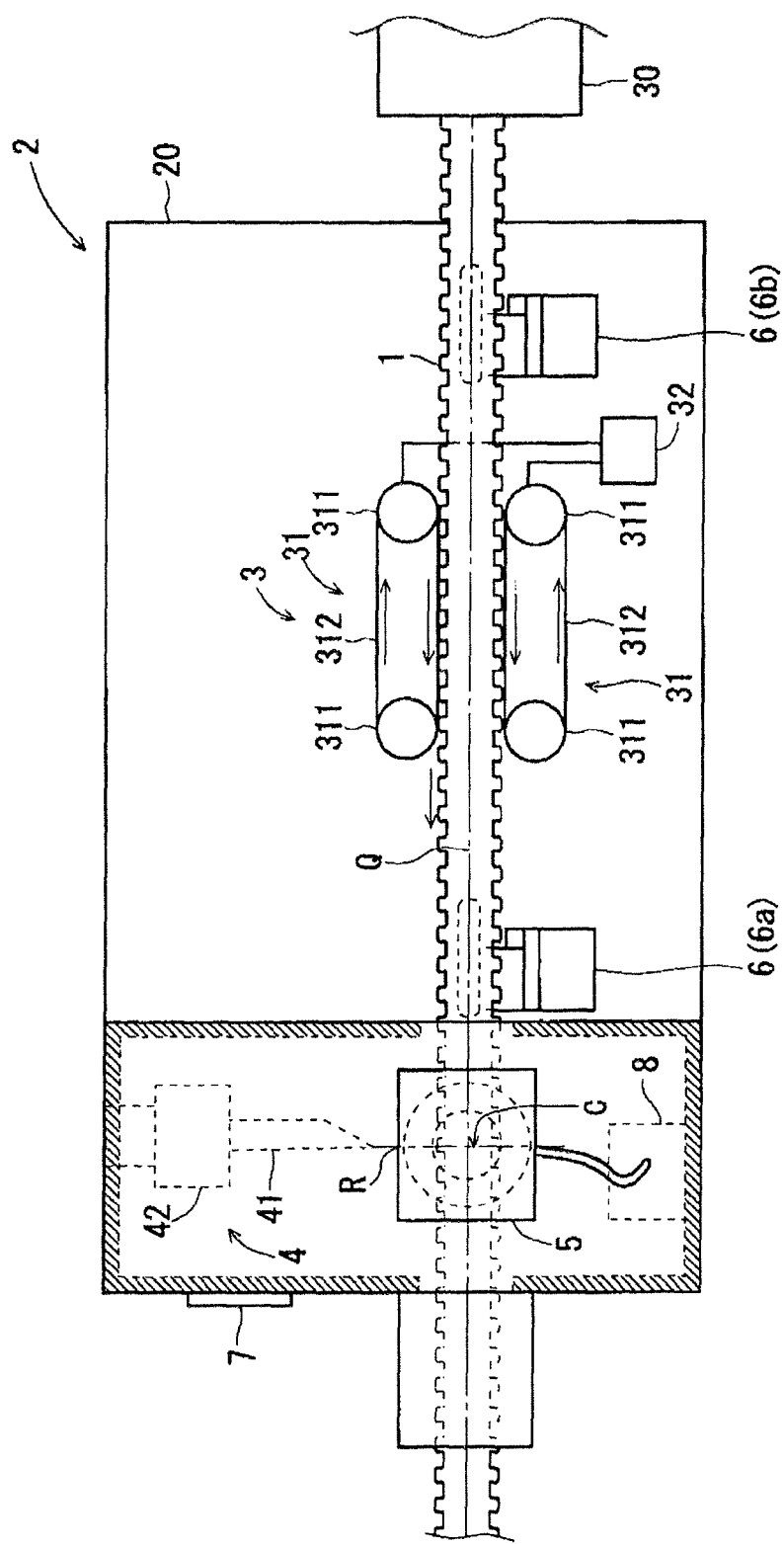
FIG. 3 is a schematic plan view that schematically illustrates the configuration of the cutting device.

A configuration of the cutting device 2 is described with reference to FIGS. 2 and 3. FIG. 2 is a schematic perspective view that schematically illustrates the configuration of the cutting device 2. FIG. 3 is a schematic plan view that schematically illustrates the configuration of the cutting device 2.

The cutting device 2 is provided with a feeder 3, a cutter 4, an imager 5, a regulator 6, an operation panel 7, and a controller 8. Further, a feeding path Q is specified in the cutting device 2 as a path along which the continuously supplied corrugated tube 1 is linearly fed from the feeder 3 toward the cutter 4.

<Feeder 3>

The feeder 3 feeds the corrugated tube 1 such that the axial direction of the corrugated tube 1 lies along the feeding path Q, the corrugated tube 1 being supplied from a tube supplier 30. The tube supplier 30 houses the corrugated tube 1, which is long before cutting, by winding or the like, and is configured to be able to continuously supply the corrugated tube 1. The feeder 3 is provided with, for example, a pair of belt mechanisms 31, 31 that are provided so as to oppose each other in a vertical direction with the feeding path Q therebetween, and a drive mechanism 32 that synchronizes and drives the pair of belt mechanisms 31, 31.

Each of the belt mechanisms 31, 31 has a pair of feeding rollers 311, 311 and a feeding belt 312. The pair of feeding rollers 311, 311 are arranged with a distance therebetween along the feeding path Q and are rotatably supported by a vertically erected support wall 20. Further, the feeding belt 312 is wound around the pair of feeding rollers 311, 311 so as to be cyclically rotatable.

The drive mechanism 32 provides a rotational drive force to the feeding rollers 311, 311. The drive mechanism 32 can be configured, for example, to include a motor (preferably, a motor capable of controlling a rotation amount, such as a step motor or servo motor) and a mechanism transmitting the rotational drive force of the motor to the feeding rollers 311, 311 (specifically, for example, a belt wound around between a pulley attached to a rotation shaft of the motor and a pulley attached to a rotation shaft of the feeding roller 311).

The corrugated tube 1 arranged along the feeding path Q is in a state of being sandwiched from above and below by the feeding belts 312, 312 of the pair of belt mechanisms 31, 31. In this state, when the drive mechanism 32 is driven and the feeding rollers 311, 311 are synchronized and rotated, the corrugated tube 1 sandwiched between the feeding belts 312, 312 is fed along the feeding path Q. Preferably, a mechanism lifting and lowering the belt mechanism 31 is provided to at least one of the belt mechanisms 31, 31. According to this configuration, by lifting or lowering the belt mechanism 31 close to or away from the feeding path Q, a gap dimension between the pair of feeding belts 312, 312 can be adjusted to correspond to a diameter of the corrugated tube 1 fed along the feeding path Q.

<Cutter 4>

The corrugated tube 1 being fed along the feeding path Q is cut along the circumferential direction of the corrugated tube 1 by the cutter 4. Specifically, the cutter 4 is provided with a cutting blade 41 and a drive mechanism 42 that reciprocates the cutting blade 41 along a cutting path R. The cutting path R is configured as a path orthogonally crossing the feeding path Q.

As the drive mechanism 42, a mechanism can be adopted, for example, in which a rotational drive force of a motor acts as a drive force via a rack and a pinion, or various linear drive mechanisms can be adopted, such as an air cylinder. When the cutting blade 41 is reciprocated along the cutting path R in response to the driving of the drive mechanism 42, the corrugated tube 1 being fed along the feeding path Q is cut along the circumferential direction of the corrugated tube 1 at an intersecting position of the cutting path R and the feeding path Q. That is, an intersecting portion of the corrugated tube 1 and the cutting path R is a planned cutting position C of the corrugated tube 1 (a position where the corrugated tube 1 is planned to be cut by the cutter 4).

<Imager 5>

The imager 5 captures an image of the planned cutting position C of the corrugated tube 1 being fed along the feeding path Q. The imager 5 can be configured to include, for example, a two-dimensional image sensor, an imaging lens, and the like. The imager 5 is arranged in such a manner that the imager 5 is parallel to the axial direction of the corrugated tube 1, has a surface area containing the planned cutting position C of the corrugated tube 1 as an imaging area, and has a field of view parallel to the imaging area.

<Regulator 6>

The regulator 6 is a functional part for regulating an orientation along the circumferential direction of the corrugated tube 1 being fed along the feeding path Q to prevent the corrugated tube 1 from twisting along the circumferential direction. The cutting device 2 is provided with two regulators 6 (6a, 6b). The regulators 6a, 6b are arranged with a distance therebetween along the feeding path Q. In particular, one regulator (first regulator) 6a is preferably arranged at a position as close as possible to the planned cutting position C, and the other regulator (second regulator) 6b is preferably arranged at a position away from the first regulator 6a on an upstream side of the feeding path Q. In this case, the first regulator 6a is arranged between the planned cutting position C and the feeder 3, and the second regulator 6b is arranged between the feeder 3 and the tube supplier 30 (that is, on a side opposite to that of the planned cutting position C, with the feeder 3 therebetween).

Figure 4:
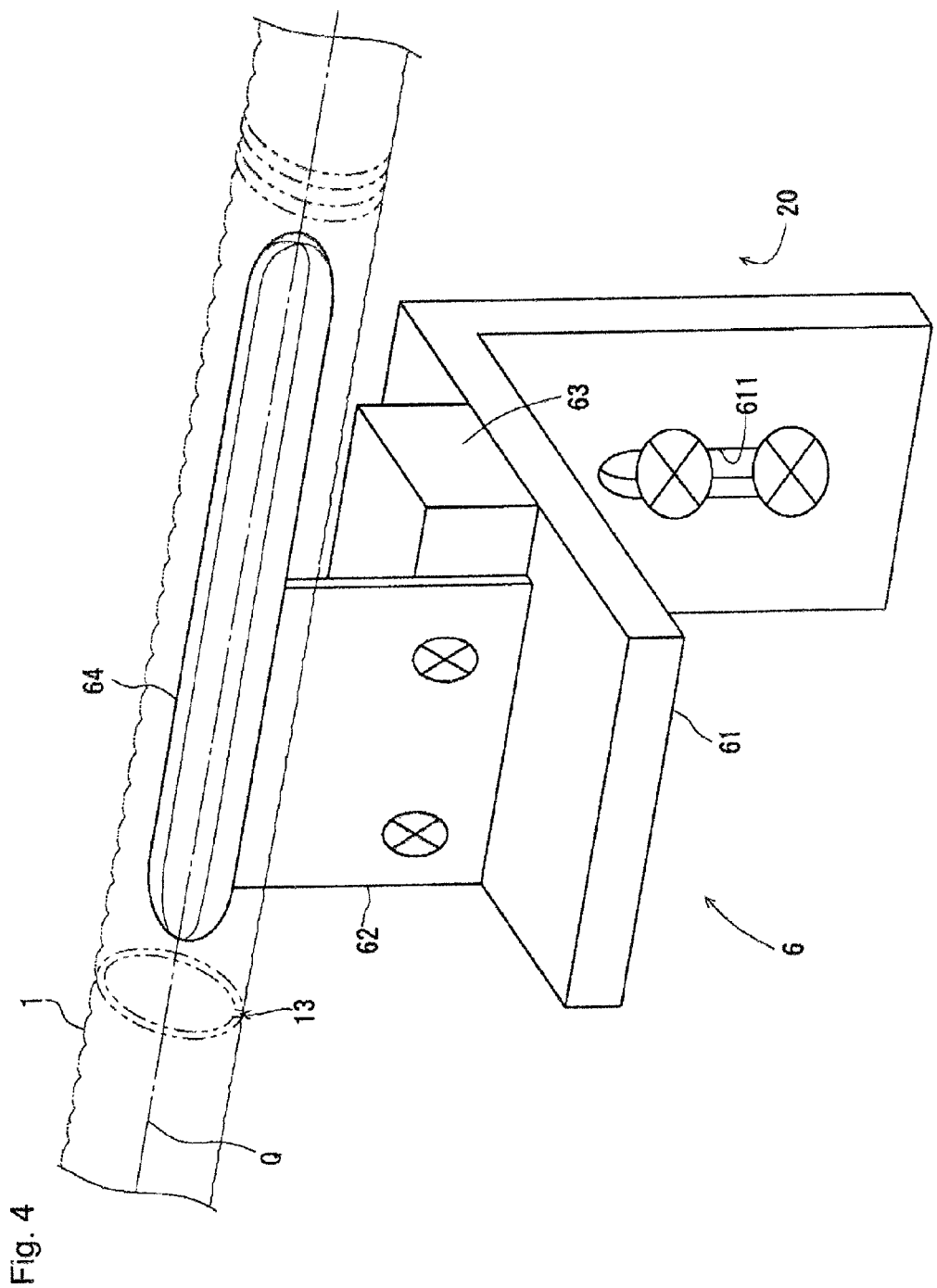
FIG. 4 is a schematic perspective view that schematically illustrates a configuration of a regulator.

A configuration of the regulator 6 is specifically described with reference to FIG. 4. FIG. 4 is a schematic perspective view that schematically illustrates the configuration of the regulator 6. The regulator 6 is provided with a support member 61 fixed on the support wall 20. A portion of the support member 61 is bent in a shape projecting from the support wall 20, and an insertion plate 62 is erected on this projecting portion. The insertion plate 62 is a thin plate-like member having a thickness of about 1 mm, for example, and is erected in an orientation in which a principal surface of the insertion plate 62 lies along the vertical direction and an extension direction of the feeding path Q. To erect the insertion plate 62 in the above determined orientation, a wall surface of an auxiliary member 63 having a rectangular cuboid shape and mounted on the support member 61 may be used as a guide surface, for example, and a principal surface of the insertion plate 62 may be fixed on the guide surface such that the principal surface lies along the guide surface. An inner insertion body 64 is fixed on an upper edge of the insertion plate 62. The inner insertion body 64 is a member having an elongated rod shape with both ends rounded and is arranged on the feeding path Q such that a longitudinal direction of the inner insertion body 64 lies along the feeding path Q.

An upper end vicinity of the insertion plate 62 and the inner insertion body 64 configure a protrusion protruding to the feeding path Q, and this protrusion is arranged in a state of being inserted into the interior of the corrugated tube 1 via the slit 13 of the corrugated tube 1 being fed along the feeding path Q. Thereby, the corrugated tube 1 is fed along the feeding path Q in a state where the orientation of the corrugated tube 1 along the circumferential direction is regulated such that the slit 13 of the corrugated tube 1 faces vertically downward.

The regulator 6 is preferably configured to be fixed by bolts to the support wall 20, for example, via an elongated hole (elongated hole having a longitudinal direction along the vertical direction) 611 on the support member 61, thereby allowing an arrangement position of the regulator 6 in the vertical direction to be adjusted. According to this configuration, by lifting or lowering the regulator 6 according to the diameter of the corrugated tube 1 being fed along the feeding path Q, the position of the inner insertion body 64 in the vertical direction can be aligned with a central axis of the corrugated tube 1 that is arranged along the feeding path Q.

<Operation Panel 7>

Referring again to FIGS. 2 and 3, the operation panel 7 is a functional part for receiving various instructions from an operator and displaying various information to the operator, and is configured by various switches, touch panels, and the like, for example. The operation panel 7 receives input such as various instructions, information, and the like from the operator.

<Controller 8>

The controller 8 is electrically connected to the above-described parts 3, 4, 5, and 7, and controls these parts to execute a process of cutting the corrugated tube 1 in the cutting device 2. A configuration of the controller 8 is specifically described below.

<i. Hardware Configuration>

Figure 5:
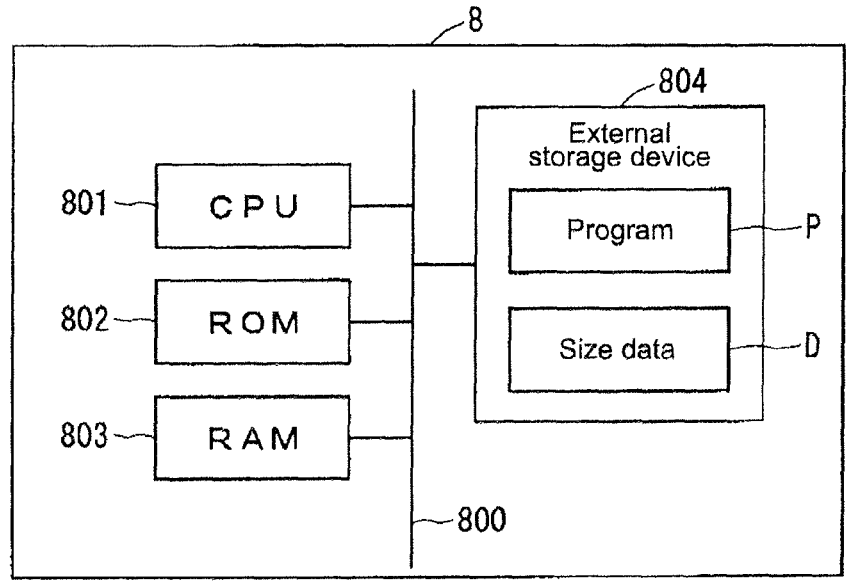
FIG. 5 is a block diagram of a hardware configuration of a controller.

FIG. 5 is a block diagram of a hardware configuration of the controller 8. The controller 8 is configured, for example, by an ordinary computer in which a CPU 801, a ROM 802, a RAM 803, an external storage device 804, and the like are mutually connected via a bus line 800. The ROM 802 stores a basic program and the like. The RAM 803 is provided as a work area when the CPU 801 executes a predetermined process. The external storage device 804 is configured by a nonvolatile storage device such as a flash memory or a hard disk device. The external storage device 804 stores a program P for performing a cutting process (to be described later). The configuration is such that the CPU 801 as a main controller performs arithmetic processing according to steps described in the program P, thereby realizing various functions associated with the cutting process. The program P is usually used by being stored in advance in a memory such as the external storage device 804. However, the program P may also be provided in a (program product) form of being recorded in a recording medium such as a CD-ROM, DVD-ROM, or an external flash memory (or may also be provided by downloading from an external server via a network) and may also be additionally or interchangeably stored in a memory such as the external storage device 804. Some or all of the functions realized by the controller 8 may be realized by hardware such as a dedicated logic circuit.

In the external storage device 804, size data D that is supplied to the cutting process is stored. The size data D will be described later.

<ii. Functional Configuration>

Figure 6:
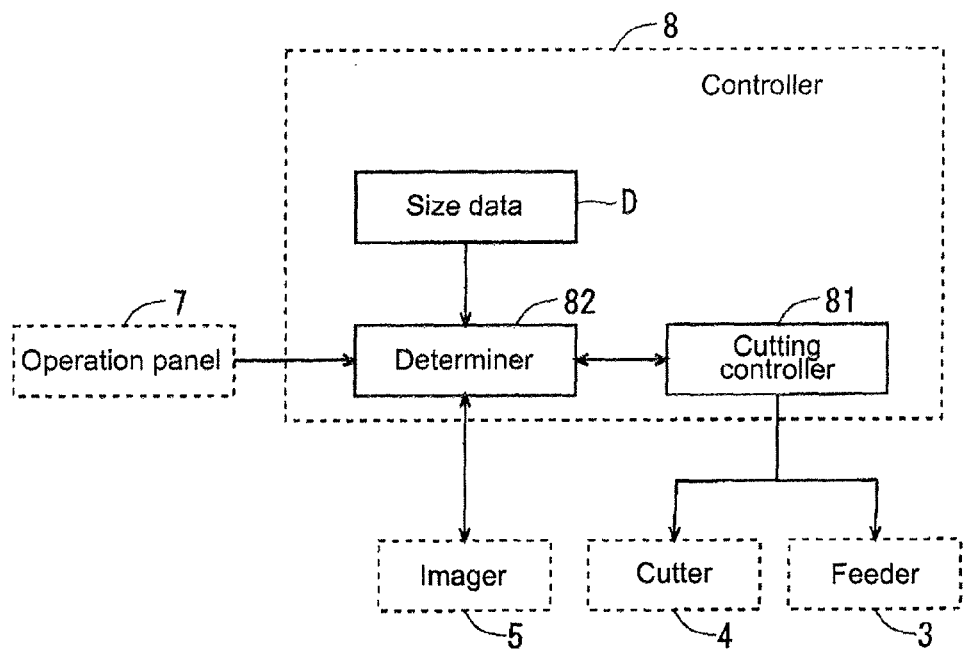
FIG. 6 is a block diagram of functional parts realized by the cutting device.

FIG. 6 is a block diagram of functions realized by the controller 8. The controller 8 is provided with functions as a cutting controller 81 and a determiner 82. These functions are realized by the CPU 801 performing predetermined arithmetic processing according to the program P as described above.

The cutting controller 81 controls the feeder 3 and the cutter 4 and causes the cutter 4 to cut the corrugated tube 1 at a suitable position. Specifically, the cutting controller 81 causes the feeder 3 to feed the corrugated tube 1 for only a required dimension and then causes the cutter 4 to cut the corrugated tube 1. However, before the cutting controller 81 causes the cutter 4 to cut the corrugated tube 1, the cutting controller 81 causes the determiner 82 to determine whether the planned cutting position C is the convex portion 11. When a positive determination result that the planned cutting position C is the convex portion 11 is obtained, the cutting controller 81 causes the cutter 4 to cut the corrugated tube 1 at the planned cutting position C. Meanwhile, when the positive determination result with respect to the planned cutting position C is not obtained, the cutting controller 81 causes the feeder 3 to feed more of the corrugated tube 1 to change a relative positional relationship between the cutter 4 and the corrugated tube 1 and causes the cutter 4 to cut the corrugated tube 1 at a position different from the planned cutting position C for which a negative determination result is given. However, control of a feeding distance is performed by, for example, detecting a feeding distance of the corrugated tube 1 based on an amount of rotation of a motor in the drive mechanism 32 of the feeder 3 (or a detection result by an encoder provided in a motor and the like) and controlling the rotation of the motor according to the detected amount. Further, control of cutting timing is performed by, for example, controlling the timing of start of rotation of a motor in the drive mechanism 42 of the cutter 4.

According to an instruction from the cutting controller 81, the determiner 82 performs a determination process (convex portion determination process) as to whether the planned cutting position C of the corrugated tube 1 is the convex portion 11 of the corrugated tube 1. Specifically, the determiner 82 causes the imager 5 to capture a captured image 9 of the planned cutting position C and performs image analysis of the captured image 9 to determine whether the planned cutting position C is the convex portion 11 of the corrugated tube 1.

<iii. Size Data D>

Figures 7, 8:
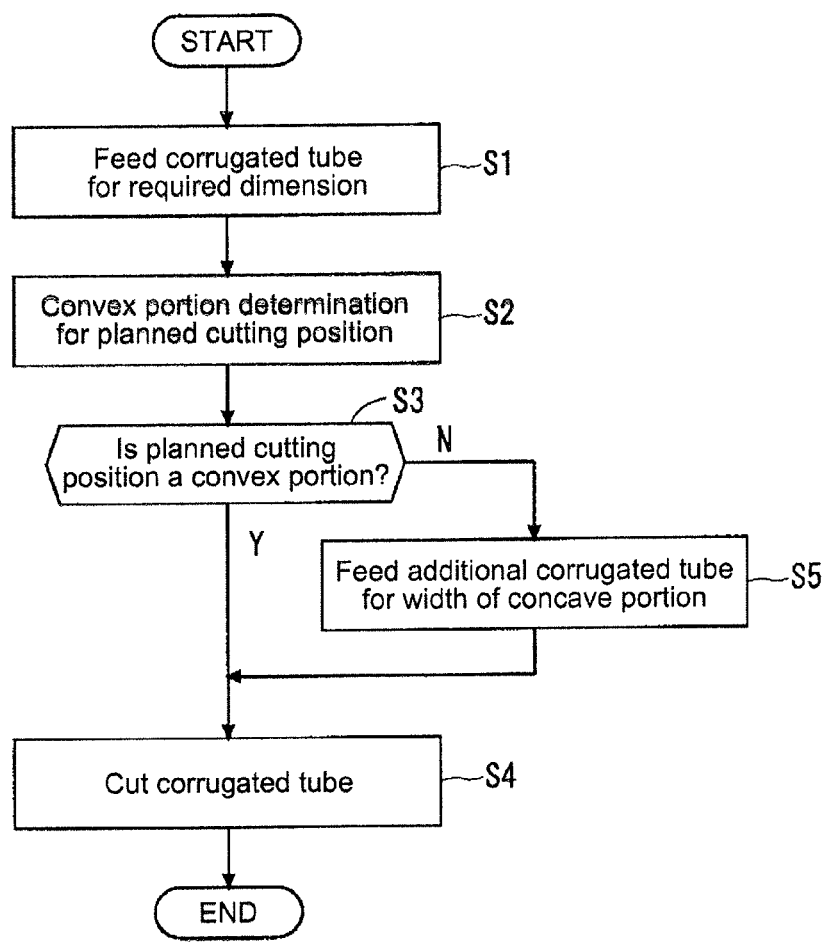
FIG. 7 is an exemplary configuration of size data.
FIG. 8 illustrates a flow of a cutting process.

The size data D stored in the external storage device 804 is information about sizes of various types of corrugated tubes having parts of different sizes, and includes, for example, dimension information of a width d1 of a convex portion, a width d2 of a concave portion, an external diameter d3, and the like (see FIG. 1) for each kind of corrugated tube. As illustrated in FIG. 7, for example, the size data D is maintained in a table format in which information about each dimension of the corrugated tube d1, d2, and d3 and an identification number (for example, a size number) of the corrugated tube are associated with each other for each of the various corrugated tubes. The information contained in the size data D is obtained, for example, by receiving from an operator via the operation panel 7.

<iv. Flow of Process>
<Overall Flow>

A cutting process using the cutting controller 81 is described with reference to FIG. 8. FIG. 8 illustrates a flow of the cutting process.

When an operator inputs, via the operation panel 7, a length dimension required for the corrugated tube 1 (required dimension) and information for identifying a size of the corrugated tube 1 (for example, the size number) and thereafter gives an instruction to start a cutting process, the cutting controller 81 receives this input operation and starts the cutting process cycle.

First, the cutting controller 81 causes the feeder 3 to feed the corrugated tube 1 for the previously input required dimension (step S1). However, in this case, the corrugated tube 1 is preferably fed for a distance slightly (for example, 1-2 mm) shorter than the previously input required dimension, within a range of acceptable dimensional accuracy. This is because there is a possibility that the corrugated tube 1 is later additionally fed for a distance of the width d2 (usually about 1-2 mm) of the concave portion 12 so that the convex portion 11 comes to the planned cutting position C.

When the corrugated tube 1 is fed for the required dimension, the cutting controller 81 causes the determiner 82 to perform the convex portion determination process for the planned cutting position C (step S2). A flow of the convex portion determination process will be described later. When a determination anomaly is detected in the convex portion determination process, the cutting controller 81 sends an exterior notification about the anomaly via the operation panel 7 and stops the cutting process thereafter.

When a positive determination result for the planned cutting position C is obtained in step S2 (that is, when the planned cutting position C is determined to be the convex portion 11 of the corrugated tube 1) (YES at step S3), the cutting controller 81 causes the cutter 4 to cut the corrugated tube 1 at the planned cutting position C (step S4). In this case, the corrugated tube 1 is out at the convex portion 11.

On the other hand, when a negative determination result for the planned cutting position C is obtained in step S2 (that is, the planned cutting position C is determined not to be the convex portion 11 of the corrugated tube 1) (NO at step S3), the cutting controller 81 identifies the width d2 of the concave portion 12 by referring to the size data D and causes the feeder 3 to feed the corrugated tube 1 for a distance of the width d2 of the concave portion 12 (step S5).

When the corrugated tube 1 is fed for the distance of the width d2 of the concave portion 12, the cutting controller 81 causes the cutter 4 to cut the corrugated tube 1 (step S4). In this case, the corrugated tube 1 is cut at a position that is distanced from the planned cutting position C by the width d2 of the concave portion 12, the planned cutting position C having received the negative determination result. Since the planned cutting position C is the concave portion 12, the position distanced from the planned cutting position C by the width d2 of the concave portion 12 is the convex portion 11. Therefore, the corrugated tube 1 is cut at the convex portion 11 in this case as well.

<Convex Portion Determination Process>

Figure 9:
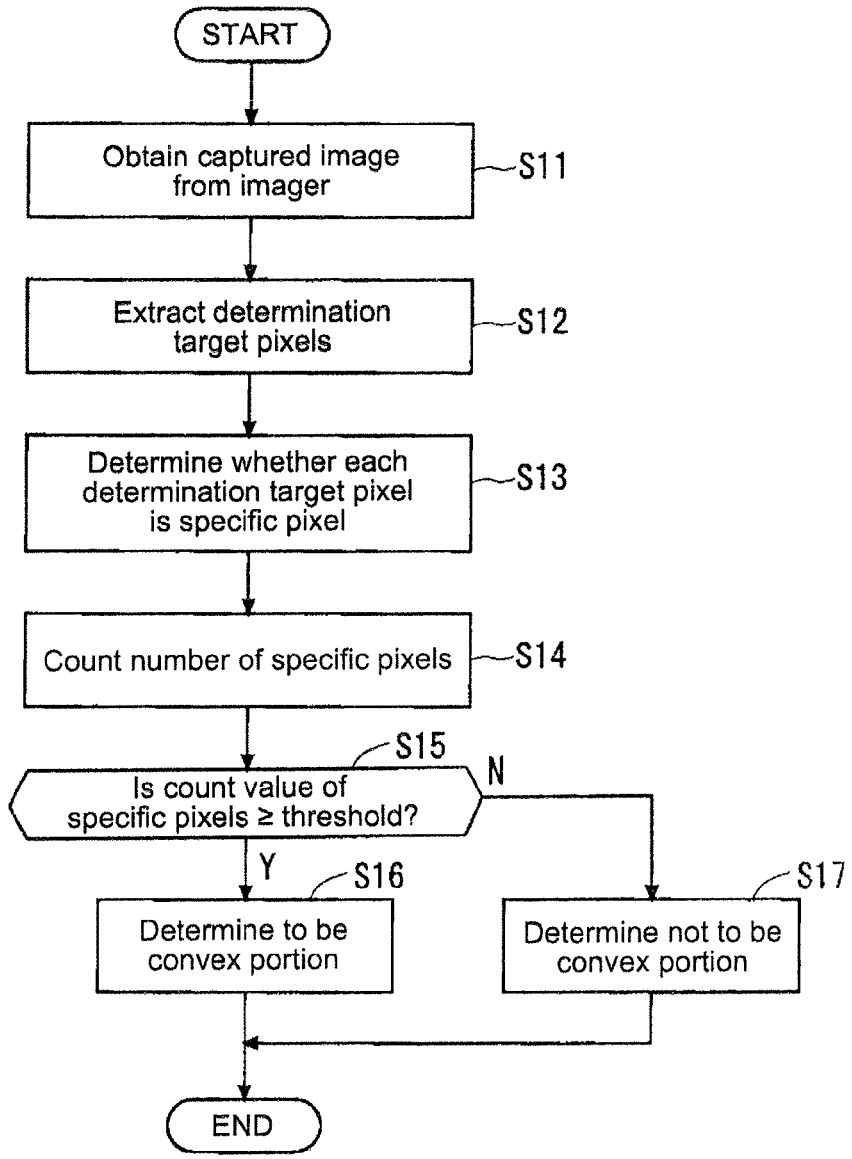
FIG. 9 illustrates a flow of a convex portion determination process.
Figure 10:
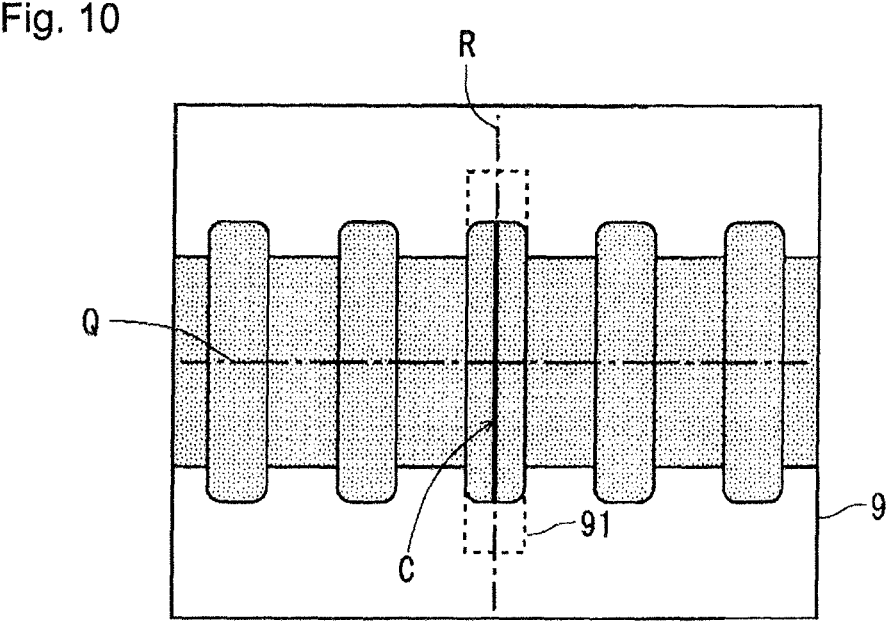
FIG. 10 schematically illustrates an example of a captured image in a case where a planned cutting position is a convex portion.
Figure 11:
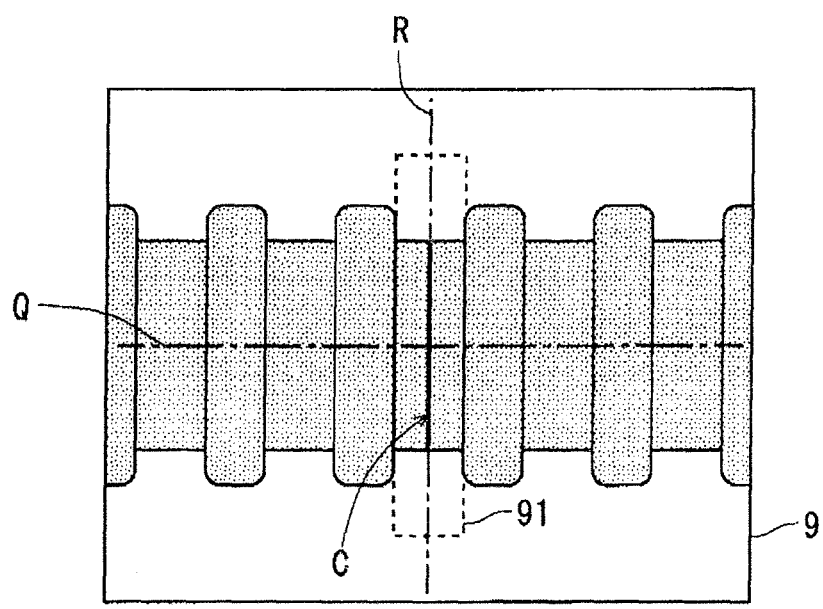
FIG. 11 schematically illustrates an example of a captured image in a case where a planned cutting position is a concave portion.

A flow of the convex portion determination process (see step S2 of FIG. 8) using the determiner 82 is specifically described with reference to FIGS. 9-11. FIG. 9 illustrates the flow of the convex portion determination process. FIG. 10 schematically illustrates an example of a captured image 9 in a case where the planned cutting position C is the convex portion 11. FIG. 11 schematically illustrates an example of the captured image 9 in a case where the planned cutting position C is the concave portion 12.

Prior to the convex portion determination process, the determiner 82 receives, from an operator via the operation panel 7, information (such as an indication of the size number) for identifying the type of the corrugated tube 1 that is a determination target and, based on the information, obtains from the size data D information about the dimensions d1, d2, d3 of the corrugated tube 1 that is the determination target.

Upon receiving an instruction from the cutting controller 81 to execute the convex portion determination process, the determiner 82 causes the imager 5 to capture an image of the planned cutting position C and obtains the captured image 9 from the imager 5 (step S11).

Subsequently, the determiner 82 extracts determination target pixels from the captured image 9 (step S12). Here, the "determination target pixels" means pixels contained in a determination target area 91 defined in the captured image 9. The "determination target area 91" means a rectangular area centered on an intersection of the feeding path Q and the cutting path R on the captured image 9. A length of the determination target area 91 along the feeding path Q is the same as the width d1 of the convex portion 11 of the corrugated tube 1 on the captured image 9. Further, a length of the determination target area 91 along the cutting path R is a length equal to or longer than the external diameter d3 of the corrugated tube 1 on the captured image 9.

Subsequently, the determiner 82 determines whether each of the extracted determination target pixels is a pixel that originates from the corrugated tube 1 (referred to as a "specific pixel" in the following) (step S13). That is, the determiner 82 determines whether the determination target pixels are the specific pixels originating from the corrugated tube 1 or background pixels originating from a background (specifically, the support wall 20). The determination can be performed based on, for example, hue of the determination target pixels. In order to improve accuracy of the determination, it is preferable that the specific pixels and the background pixels have a large hue difference. For this purpose, a configuration may be adopted in which, for example, a backlight is embedded in a partial area of the support wall 20 that is imaged as the background of the corrugated tube 1, causing the partial area to emit surface light. According to this configuration, an orthogonal projection area of the corrugated tube 1 becomes a shadow and is imaged in the captured image 9. Therefore, the specific pixels are concentratedly distributed in a relatively dark hue area and the background pixels are concentratedly distributed in a relatively bright hue area. Therefore, the specific pixels and the background pixels can be easily and accurately distinguished. Further, for example, a configuration is also effective in which the partial area of the support wall 20 that is imaged as the background is covered by a member that does not reflect much light (such as a urethane member or a sponge member), a member of a color different from the corrugated tube 1, or the like. Also according to this configuration, the hue area where the specific pixels distribute and the hue area where the background pixels distribute can be separated so that the specific pixels and the background pixels can be easily and accurately distinguished.

Subsequently, the determiner 82 counts the number of the specific pixels (step S14). Comparing the captured image 9 where the planned cutting position C is the convex portion 11 (FIG. 10) and the captured image 9 where the planned cutting position C is the concave portion 12 (FIG. 11), the former contains a large number of the specific pixels in the determination target area 91 and therefore a count value of the specific pixels is large.

Subsequently, based on the count value of the specific pixels obtained at step S14, the determiner 82 determines whether the planned cutting position C is the convex portion 11. Specifically, when the count value of the specific pixels is equal to or larger than a predetermined threshold W (YES at step S15), the planned cutting position C is determined to be the convex portion 11 (step S16). When the count value of the specific pixels is smaller than the predetermined threshold W (NO at step S15), the planned cutting position C is determined not to be the convex portion 11 (step S17).

When the count values of the specific pixels obtained from the captured image 9 of the planned cutting position C for each of a state where a center of the convex portion 11 is at the planned cutting position C (FIG. 10) and a state where a center of the concave portion 12 is at the planned cutting position C (FIG. 11) are respectively set as a "maximum number N1" and a "minimum number N2," the threshold W is set to be sufficiently larger than the minimum number N2 and equal to or smaller than the maximum number N1. For example, when the threshold W is set to be the maximum number N1, a positive determination result is given for the planned cutting position C only when 100% of the convex portion 11 is contained in the determination target area 91 (that is, when the center of the convex portion 11 is at the planned cutting position C). Further, for example, when the threshold W is set to be a value slightly larger than an average value of the maximum number N1 and the minimum number N2, a positive determination result is given for the planned cutting position C when half or more of the convex portion 11 is contained in the determination target area 91. That is, in this case, a positive determination result is given for the planned cutting position C when a portion of the convex portion 11 overlaps the planned cutting position C even though the center of the convex portion 11 is displaced to some extent from the planned cutting position C. The operator is preferably allowed to arbitrarily select as the threshold W any value that is sufficiently larger than the minimum number N2 and is equal to or smaller than the maximum number N1.

However, values of the maximum number N1 and the minimum number N2 are different depending on the size of the corrugated tube 1 that is the determination target. For example, the values are larger when the external diameter d3 of the corrugated tube 1 is larger. Therefore, based on the information obtained from the size data D about each of the dimensions d1, d2, and d3 of the corrugated tube 1 that is the determination target, the determiner 82 calculates the values of the maximum number N1 and the minimum number N2 and determines the threshold W based on the calculated values. That is, the threshold W is a value defined according to the size of the corrugated tube 1. Moreover, the values of the maximum number N1 and the minimum number N2 may be calculated in advance and stored in the size data D in association with the size number.

When the specific pixels are properly counted, the obtained count value should not be an extremely large value as compared to the maximum number N1. When a count value is obtained that is an extremely large value as compared to the maximum number N1, there is a high possibility that a credible count value has not been obtained. Therefore, an upper threshold may be further defined and it may be determined that the determination is abnormal when the count value of the specific pixels is larger than the upper threshold. In this case, the upper threshold may be set to be a value, for example, slightly (for example, about 10 pixels) larger than the maximum number N1.

3. Effects

According to the above embodiment, when the determiner 82 gives a positive determination result for the planned cutting position C in the convex portion determination process, the cutting controller 81 causes the cutter 4 to cut the corrugated tube 1 at the planned cutting position C. Therefore, the corrugated tube 1 can be reliably cut at the convex portion 11. In this case, the determiner 82 performs image analysis of the captured image 9 obtained by imaging the planned cutting position C to determine whether the planned cutting position C is the convex portion 11. Therefore, corrugated tubes of various sizes can be flexibly handled and an accurate determination result can be obtained. That is, in this embodiment, corrugated tubes of various sizes can be easily and reliably cut at the convex portion.

Further, according to the above embodiment, when the determiner 82 gives a negative determination result for the planned cutting position C in the convex portion determination process, the cutting controller 81 causes the cutter 4 to cut the corrugated tube 1 at a position different from the planned cutting position C for which the negative determination result is given (specifically, at a position that is distanced from the planned cutting position C by the width d2 of the concave portion 12). Therefore, it is possible to reliably avoid cutting the corrugated tube 1 at the concave portion 12 while inhibiting a reduction in productivity.

Further, according to the above embodiment, the regulators 6 are provided that regulate the orientation along the circumferential direction of the corrugated tube 1 being fed along the feeding path Q. Therefore, twisting is unlikely to occur in the corrugated tube 1 being fed along the feeding path Q. In particular, here, the plurality of regulators 6 are arranged with a distance therebetween along the feeding path Q. Therefore, twisting of the corrugated tube 1 being fed along the feeding path Q can be reliably prevented. Further, one regulator 6 (the first regulator 6a) is arranged between the planned cutting position C and the feeder 3. Therefore, the corrugated tube 1 is ensured to be in a state free of twisting at the planned cutting position C. Therefore, the corrugated tube 1 in the state free of twisting is imaged by the imager 5 so that the convex portion determination process can be accurately performed. Further, the cutter 4 can cut in a straight manner along the circumferential direction of the corrugated tube 1.

Further, according to the above embodiment, the determiner 82 determines whether the planned cutting position C is the convex portion 11 of the corrugated tube 1 based on whether the number of the specific pixels originating from the corrugated tube 1, among the pixels in the determination target area 91 defined in the captured image 9 (determination target pixels), is equal to or larger than the predetermined threshold W. According to this configuration, by changing only the value of the threshold W, the convex portion determination process can be easily and accurately performed with respect to corrugated tubes of various sizes.

4. Modified Embodiment

Figure 12:
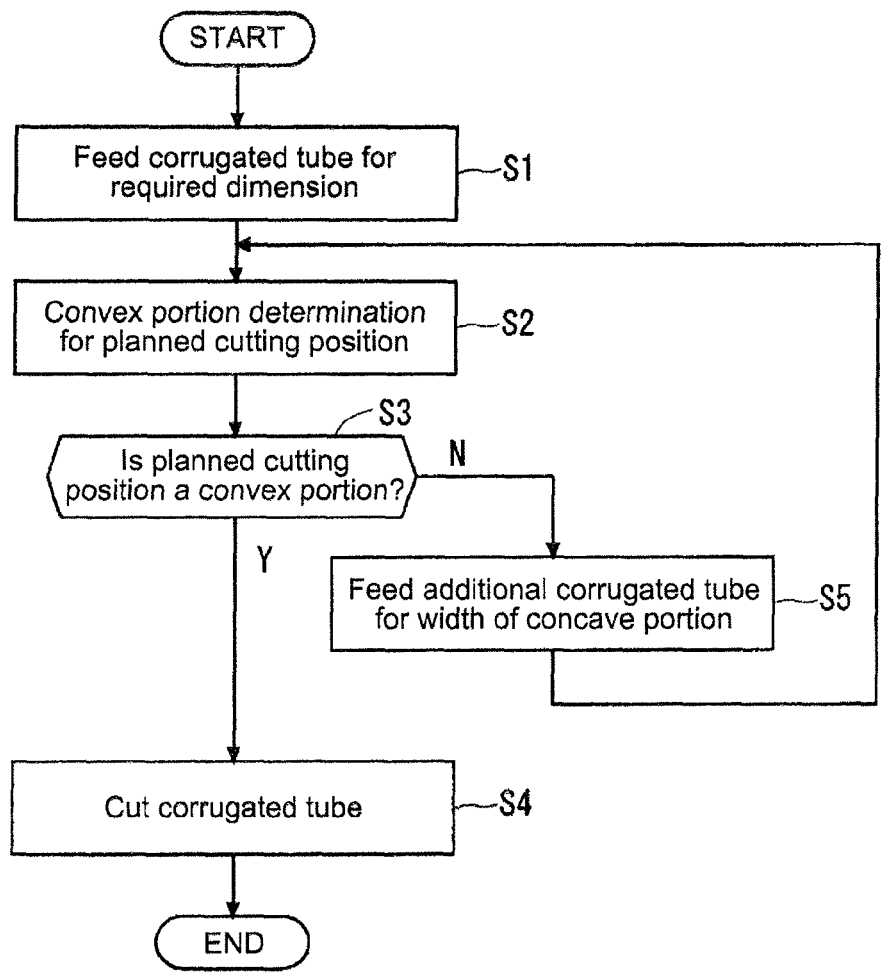
FIG. 12 illustrates a flow of a cutting process according to a modified embodiment.

In the above embodiment, the configuration is adopted in which, when the planned cutting position C is determined not to be the convex portion 11 of the corrugated tube 1, the cutting controller 81 causes the feeder 3 to feed the corrugated tube 1 for a distance of the width d2 of the concave portion 12 (step S5) and then causes the cutter 4 to cut the corrugated tube 1. However, an embodiment is also possible in which the determiner 82 is again caused to perform the convex portion determination process for a new planned cutting position C for the state where the corrugated tube 1 has been fed for the distance of the width d2 of the concave portion 12. That is, as illustrated in FIG. 12, after the corrugated tube 1 is fed for the distance of the width d2 of the concave portion 12 (step S5), the processing may return again to step S2 and the determiner 82 may be caused to perform the convex portion determination process for the new planned cutting position C. In this case, until a positive determination result is obtained in step S2, the series of step S5 and step S2 may be repeated.

According to this modified embodiment, after the determiner 82 finds the planned cutting position C for which a positive determination result is given in the convex portion determination process, the corrugated tube 1 is cut at the planned cutting position C. Therefore, it is possible to reliably avoid cutting the corrugated tube 1 at the concave portion 12.

5. Other Modified Embodiments

In the above embodiment, the configuration is adopted in which two regulators 6 are provided. However, it is not necessary to provide a plurality of the regulators 6. On the other hand, a configuration may also be adopted in which three or more regulators 6 are provided. In each of these cases, at least one regulator 6 is preferably arranged at a position as close to the planned cutting position C as possible.

Further, an embodiment in which the determiner 82 performs image analysis of the captured image 9 to determine whether the planned cutting position C is the convex portion 11 of the corrugated tube 1 is not limited to the one described above. For example, an embodiment may also be adopted in which a contour of the corrugated tube 1 is extracted from the captured image 9 by edge detection or the like in order to determine whether the planned cutting position C is the convex portion 11 of the corrugated tube 1.

Further, in the above embodiment, the cutter 4 is fixed at a fixed position along the feeding path Q and the relative positional relationship between the cutter 4 and the corrugated tube 1 is changed by the feeder 3 feeding the corrugated tube 1. However, an embodiment in which the relative positional relationship between the cutter 4 and the corrugated tube 1 is changed is not necessarily limited to this. For example, an embodiment may also be adopted in which the relative positional relationship between the cutter 4 and the corrugated tube 1 is changed by displacing the cutter 4 along the feeding path Q.

Further, in the above embodiment, a configuration may also be adopted in which a plurality of rectangular areas are defined on the captured image 9, each having an up-down central axis that coincides with the feeding path Q and having a length along the feeding path Q that is the same as the width d1 of the convex portion 11. For each of the rectangular areas, the number of specific pixels contained in the rectangular area is counted, and the cutter 4 is caused to cut the corrugated tube 1 at a left-right central axis of a rectangular area containing the largest number of the specific pixels.

The present invention is described in detail. However, the above description is in all aspects for exemplary purposes and the present invention is not limited by the description. Numerous modified embodiments that are not exemplified can be envisioned without departing from the scope of the present invention.

DESCRIPTION OF REFERENCE NUMERALS 1 corrugated tube
2 cutting device
3 feeder
4 cutter
5 imager
6 regulator
7 operation panel
8 controller
81 cutting controller
82 determiner
D size data

The invention claimed is:
1. A corrugated tube cutting device comprising:
a feeder feeding a corrugated tube such that an axial direction of the corrugated tube lies along a feeding path;
a cutter cutting along a circumferential direction of the corrugated tube being fed along the feeding path;
an imager capturing an image of a planned cutting position of the corrugated tube;
a determiner performing image analysis of the captured image of the planned cutting position to determine whether the planned cutting position is a convex portion of the corrugated tube; and
a cutting controller that causes feeder to feed the corrugated tube for a required dimension and then causes the cutter to cut the corrugated tube at the planned cutting position when the determiner determines that the planned cutting position is a convex portion of the corrugated tube,
wherein
the cutting controller causes the cutter to cut the corrugated tube at a position different from the planned cutting position when the determiner determines that the planned cutting position is not a convex portion of the corrugated tube.
2. The corrugated tube cutting device according to claim 1 comprising:

a regulator provided with a protrusion protruding toward the feeding path, the regulator regulating an orientation along the circumferential direction of the corrugated tube being fed along the feeding path by arranging the protrusion in a condition inserted into an interior of the corrugated tube via a running slit along the axial direction of the corrugated tube.

3. The corrugated tube cutting device according to claim 2, wherein
a plurality of the regulators are provided and are arranged at intervals along the feeding path.

4. The corrugated tube cutting device according to claim 3, wherein
at least one of the plurality of regulators is arranged between the planned cutting position and the feeder.

5. The corrugated tube cutting device according to claim 1, wherein
the determiner defines a partial area centered on the planned cutting position and having a width equal to a width of the convex portion of the corrugated tube as a determination target area on the captured image, and determines that the planned cutting position is the convex portion of the corrugated tube when a number of pixels originating from the corrugated tube in the determination target area is equal to or larger than a predetermined threshold, the predetermined threshold being defined according to a size of the corrugated tube.

6. The corrugated tube cutting device according to claim 1, wherein
the cutter comprises:
    a cutting blade; and
    a drive mechanism reciprocating the cutting blade along a cutting path crossing the feeding path, and
the imager captures an image of an intersection of the feeding path and the cutting path.

7. A corrugated tube cutting device comprising:
a feeder feeding a corrugated tube such that an axial direction of the corrugated tube lies along a feeding path;
a cutter cutting along a circumferential direction of the corrugated tube being fed along the feeding path;
an imager capturing an image of a planned cutting position of the corrugated tube;
a determiner performing image analysis of the captured image of the planned cutting position to determine whether the planned cutting position is a convex portion of the corrugated tube;
a cutting controller that causes feeder to feed the corrugated tube for a required dimension and then causes the cutter to cut the corrugated tube at the planned cutting position when the determiner determines that the planned cutting position is a convex portion of the corrugated tube; and
a regulator provided with a protrusion protruding toward the feeding path, the regulator regulating an orientation along the circumferential direction of the corrugated tube being fed along the feeding path by arranging the protrusion in a condition inserted into an interior of the corrugated tube via a running slit along the axial direction of the corrugated tube.

8. A corrugated tube cutting device comprising:
a feeder feeding a corrugated tube such that an axial direction of the corrugated tube lies along a feeding path;
a cutter cutting along a circumferential direction of the corrugated tube being fed along the feeding path;
an imager capturing an image of a planned cutting position of the corrugated tube;
a determiner performing image analysis of the captured image of the planned cutting position to determine whether the planned cutting position is a convex portion of the corrugated tube; and
a cutting controller that causes feeder to feed the corrugated tube for a required dimension and then causes the cutter to cut the corrugated tube at the planned cutting position when the determiner determines that the planned cutting position is a convex portion of the corrugated tube,
wherein
the determiner defines a partial area centered on the planned cutting position and having a width equal to a width of the convex portion of the corrugated tube as a determination target area on the captured image, and determines that the planned cutting position is the convex portion of the corrugated tube when a number of pixels originating from the corrugated tube in the determination target area is equal to or larger than a predetermined threshold, the predetermined threshold being defined according to a size of the corrugated tube.

* * * * *